United States Patent [19]

Kiya

[11] Patent Number: 4,584,509
[45] Date of Patent: Apr. 22, 1986

[54] METHOD OF DISCRIMINATING PRESENT POSITION REGION OF A MACHINE

[75] Inventor: Nobuyuki Kiya, Hschioji, Japan
[73] Assignee: Fanuc Ltd., Minamitsuru, Japan
[21] Appl. No.: 634,109
[22] PCT Filed: Nov. 17, 1983
[86] PCT No.: PCT/JP83/00415
    § 371 Date: Jul. 18, 1984
    § 102(e) Date: Jul. 18, 1984
[87] PCT Pub. No.: WO84/02100
    PCT Pub. Date: Jun. 7, 1984

[30] Foreign Application Priority Data

Nov. 19, 1982 [JP] Japan .................... 57-203434

[51] Int. Cl.$^4$ .................................. G05B 19/24
[52] U.S. Cl. .................................. 318/571; 318/573; 364/474
[58] Field of Search ................ 318/571, 573; 364/474

[56] References Cited

U.S. PATENT DOCUMENTS

| | | | |
|---|---|---|---|
| 3,585,478 | 6/1971 | Leenhouts | 318/573 |
| 3,943,343 | 3/1976 | Irie | 318/573 X |
| 4,163,932 | 8/1979 | Leenhouts | 318/573 |
| 4,164,693 | 8/1979 | Leenhouts | 318/573 |
| 4,507,738 | 3/1985 | Nozawa et al. | 318/573 X |

*Primary Examiner*—B. Dobeck
*Attorney, Agent, or Firm*—Staas & Halsey

[57] ABSTRACT

A machine present position region discrimination method divides a stroke, over which a movable portion of a machine travels along a single controlled axis, into n equal parts to partition the stroke into regions, each region having a length I. A region number is assigned to each region sequentially from one end of the stroke to the other. A present position region number A is incremented or decremented in dependence upon the travelling direction when an accumulated travelling distance B of the movable portion of the machine exceeds the region interval length I (during movement in the positive direction), or is less than zero (during movement in the negative direction). The resulting present position region number A, which is indicative of the present position region of the movable portion of the machine, is supplied by an NC unit in which the present position region number A is calculated to the controlled machine. When the present position region number A is incremented or decremented by the interval length I, the reverse operation, i.e., decrementing or incrementing, respectively, is performed on the travelled distance B which thereby indicates the position within the region.

3 Claims, 3 Drawing Figures

METHOD OF DISCRIMINATING PRESENT POSITION REGION OF A MACHINE

BACKGROUND OF THE INVENTION

1. Technical Field

This invention relates to a method of discriminating the present position region of a machine.

2. Description of the Related Art

Conventionally a numerically controlled (hereafter referred to as "NC") machine tool has a dog provided on a movable portion of the machine tool and a limit switch provided at a prescribed position on a stationary portion of the machine tool. When the dog trips the limit switch, a signal is generated that the movable portion of the machine has reached the prescribed position, whereupon a predetermined operation is executed. By way of example, in an operation for returning a movable portion such as a table to a reference point, the dog trips a deceleration limit switch in the vicinity of the reference point, whereupon an NC unit controlling the machine tool takes this as an indication that the table has reached the vicinity of the reference point and responds by providing a command for reducing the travelling velocity. Further, in a tool change operation, a tool rest is moved toward a tool change position. At the tool change position, a dog provided on the tool rest trips the limit switch, whereby the machine tool halts the tool rest at a stopping position and thereafter performs the tool change.

Thus, in the prior art, a dog and a limit switch are provided at appropriate locations and, when a prescribed limit switch is actuated, a predetermined operation is performed by the NC apparatus or the machine tool. This means that a dog and limit switch are essential, thereby increasing the number of component parts. Another disadvantage is that mounting and adjusting the dog and limit switch are troublesome operations.

SUMMARY OF THE INVENTION

An object of the present invention is to provide a novel method of discriminating the present position region of a machine, whereby a region at which a movable position resides can be discriminated without mounting a dog or limit switch.

A machine present position control region discrimination method according to the present invention, utilized by a numerical control system which performs numerical control of a movable portion of a machine tool, comprises the following steps: dividing a stroke along a controlled coordinate axis into n equal parts to partition the stroke into n regions, each having an interval length; assigning a region number to each region incrementing or decrementing a present position region number in dependence upon a travelling directon when an accumulated travelling distance of the movable portion of the machine exceeds a range bounded by zero and the interval length and delivering a present position region signal, which is indicative of the present position region number, from the NC control system to the machine.

According to the present invention, it is not necessary to provide a dog or limit switch as in the prior art, thereby providing an advantage in terms of cost. Moreover, complicated tasks such as mounting and positional adjustments are no longer required.

DESCRIPTION OF THE PREFERRED EMBODIMENT

An embodiment of the present invention will now be described in detail with reference to the drawings.

Figure 1:
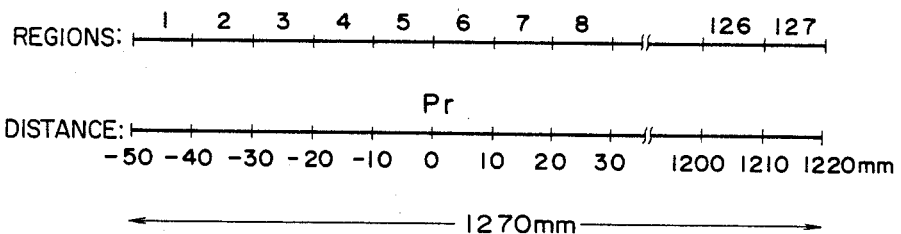
FIG. 1 is an illustrative view depicting movement regions.

FIG. 1 is an illustrative view of the range of movement of a machine tool having a full stroke of 1270 mm along a certain coordinate axis, e.g., the X axis the stroke being equally divided into 127 movement regions. The stroke in the negative direction from a reference point Pr is 50 mm, and the stroke in the positive direction in 1220 mm. Regions are defined with an interval length of 10 mm intervals. The region in the −50~ −40 mm interval is defined as a first region, that in the −40~ −30 mm interval a second region, and so on through the region in the 1210~1220 mm interval, which is defined as a 127th region.

Figure 2:
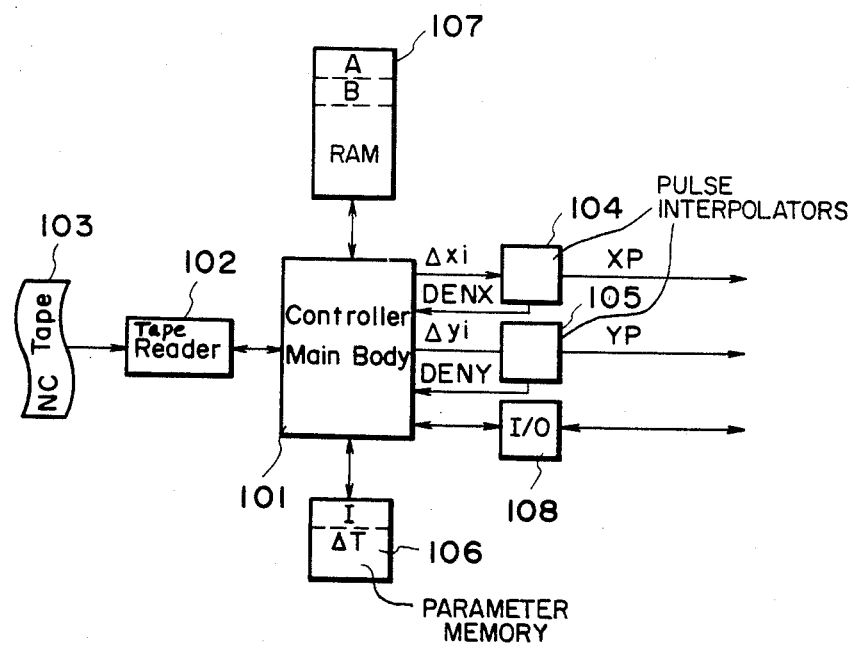
FIG. 2 is a block diagram of an NC apparatus capable of utilizing a method according to the present invention.
Figure 3:
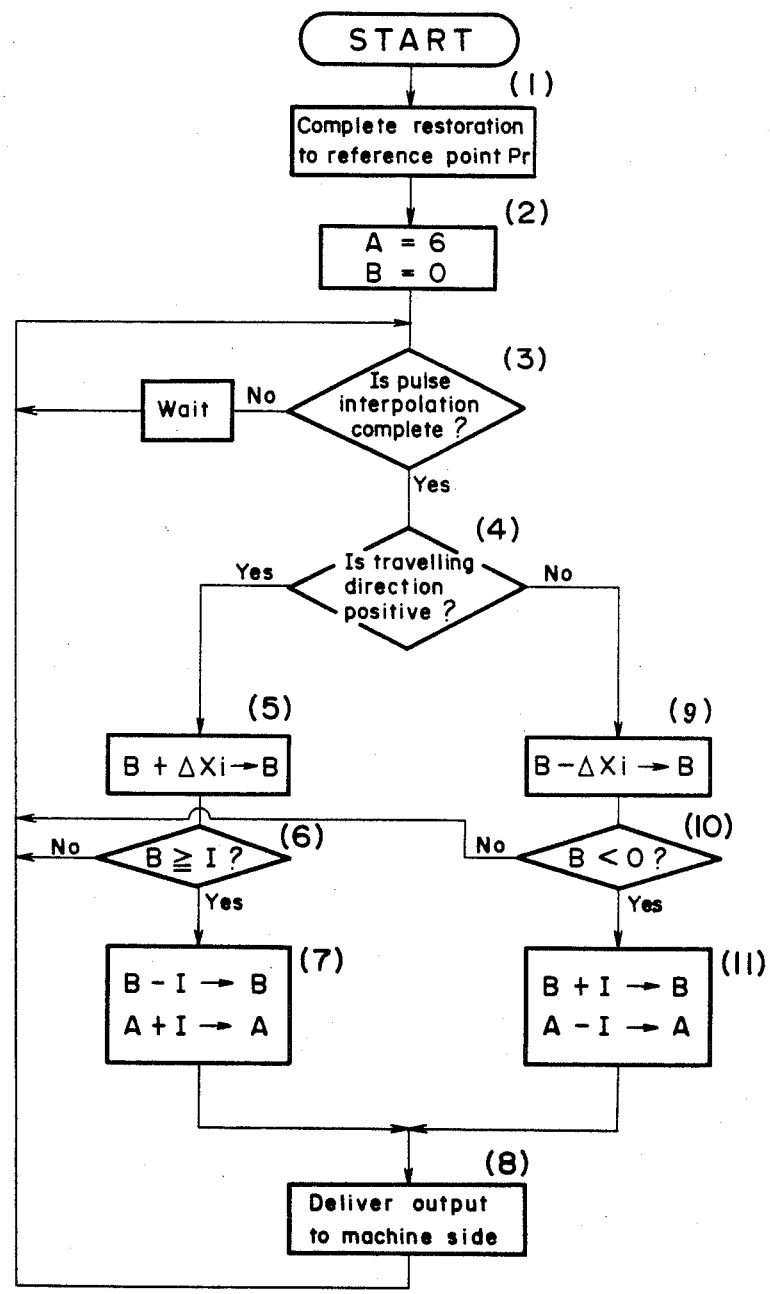
FIG. 3 is a flowchart of a method according to the present invention.

FIG. 2 is a block diagram of an NC apparatus for practicing the method of discriminating a present position region of a machine according to the present invention. FIG. 3 is a flowchart illustrating the method.

A controller main body 101, illustrated in FIG. 2, controls a tape reader 102 to temporarily store the entirety of a machining program from an NC tape 103 in a RAM 107, after which the controller reads the machining program out of the RAM 107 block by block to perform numerical control processing. Specifically, if the NC data is path data, the distance to be travelled may be defined as Xi, Yi (incremental values). Using feed velocities Fx and Fy, defined below, then the controller main body 101 performs the following operations:

$$\Delta Xi = Fx \cdot \Delta T \quad (1)$$

$$\Delta Yi = Fy \cdot \Delta T \quad (2)$$

to obtain travelling distances ΔXi, ΔYi along the respective X and Y axes during a predetermined period of time ΔT. These travelling distances are applied to pulse interpolators 104, 105, respectively. It should be noted that ΔT is a period of time preset as a parameter in a parameter memory 106. Fx and Fy and X- and Y-axis velocities, respectively, which are determined by the following equations:

$$Fx = F \cdot Xi / \sqrt{Xi^2 + Yi^2} \quad (3)$$

$$Fy = F \cdot Yi / \sqrt{Xi^2 + Yi^2} \quad (4)$$

where F is the feed velocity from the machining program.

When ΔXi, ΔYi are applied to the pulse interpolators 104, 105, pulse interpolation computations are performed. The pulse interpolators 104, 105 apply interpolated pulses Xp, Yp to X- and Y-axis servo units, which are not shown, thereby rotating servomotors to transport a movable portion such as a table or tool along a commanded path. When a number Nx of interpolated pulses Xp along the X axis and a number Ny of interpolated pulses Yp along the Y axis become equal to $\Delta Xi$, $\Delta Yi$, respectively, namely when the following is true:

$$Nx = \Delta Xi \qquad (5)$$

$$Ny = \Delta Yi \qquad (6)$$

the pulse interpolators deliver pulse distribution end signals DENX, DENY to the controller main body 101. As a result, the controller main body 101 accumulates $\Delta Xi$, $\Delta Yi$ and determines whether or not the movable portion has arrived at a target position. If it has not, the controller computes subsequent items of travelling distance data $\Delta Xi+1$, $\Delta Yi+1$ from Eqs. (1) and (2) (normally, $\Delta Xi+1 = \Delta Xi$, $\Delta Yi+1 = \Delta Yi$), and applies these to the pulse interpolators 104, 105, respectively. This is followed by execution of similar processing. When the movable portion arrives at the target position along the commanded path, the controller main body 101 reads the next block of NC data out of the RAM 107 and executes NC processing on the basis of this NC data.

Meanwhile, as the NC processing is being executed, the controller main body 101, under the control of a control program, performs processing, described below, for discriminating the present position region of the controlled machine. This processing will be described with reference to the flowchart illustrated in FIG. 3. We will assume that the movable portion of the machine has been restored to the reference point Pr at the start of this processing by means of a well-known reference point return operation (step 1). In response to completion of the reference point return operation, a present position region number A stored in the RAM 107 shall be set to "6" (A=6), and a numerical value B indicating a position within the region shall be set to 0 (step 2). Though the following description shall be confined to the X axis, this is no way places a limitation upon the invention. Since the description could apply equally well to any other axis.

When path data or positioning data are read out of the RAM 107 and $\Delta Xi$ is delivered to the pulse interpolator 104, the latter performs a pulse interpolation operation (step 3). When this operation is carried out, the controller main body 101 executes the following process steps, depending upon the direction of travel:

(a) If the direction of travel is positive (+X direction) (step 4), then, upon completion of travel over the distance $\Delta Xi$ (DENX = "1"), the following operation is peformed (step 5):

$$B + \Delta Xi \rightarrow B$$

(b) B representing the travelled distance accumulated in step 5, and a region interval length I, which is stored in the parameter memory 106, are compared in terms of magnitude (step 6).

(c) If $B \geq I$ is true, the following operation is performed:

$$A + 1 \rightarrow A$$

to incement the region number A, as well as the following operation:

$$B - I \rightarrow B$$

to obtain the position of the movable portion in the new region (step 7).

(d) The computed present position region number A is delivered to the machine through a data input/output unit 108 (step 8). If $B < I$ is true (step 6) and, the system again waits for $\Delta Xi$ to be produced. When it is produced, steps 3 through 6 are repeated.

(e) Meanwhile, if the direction of travel is negative (−X direction), then the following operation is performed at the end of the interpolation for $\Delta Xi$ (step 9):

$$B - \Delta Xi \rightarrow B$$

(f) B and 0 are compared in magnitude.

(g) If $B < 0$ is true (step 10), then the following operation is performed:

$$A - 1 \rightarrow A$$

to decrement the region number, as well as the following operation (step 11):

$$B + I \rightarrow B$$

to obtain the position of the movable portion in the new region.

(h) The computed present position region number A is delivered to the machine through the data input/output unit 108 (step 8). If $B \geq 0$ is true (step 9), the system waits for $\Delta Xi$ to be produced. When it is produced, steps 3, 4, 9 and 10 are repeated.

Though the foregoing description relates solely to the X axis, the present invention is not limited thereby. Regions can be discriminated in similar fashion with regard to the Y and Z axes as well.

The present invention is not only well-suited for application to numerically controlled machine tools but can also be used in any arrangement such as an electric discharge machine or laser cutter that requires verification of the operating position of a movable machine element.

I claim:

1. A machine present position region discrimination method utilized by a numerical control system which performs a numerical control operation based on a present position of a movable portion of a machine having a travelling direction, the machine present position region discrimination method comprising the steps of:
   (a) dividing a stroke of substantially all possible movement along a controlled coordinate axis into n equal parts to partition the stroke into n regions, each of the regions having an interval length;
   (b) assigning a region number to each of the regions;
   (c) accumulating a travelled distance of the movable portion of the machine across the regions;
   (d) performing one of incrementing and decrementing the present position region number by the interval length in dependence upon the travelling direction of the movable portion of the machine, when the travelled distance exceeds a range bounded by zero and the interval length; and
   (e) delivering a present position region signal, which is indicative of the present position region of the movable portion of the machine, from the numerical control system to the machine.

2. A machine present position region discrimination method according to claim 1, wherein said present position region discrimination method is applied to at least two controlled coordinate axes.

3. A machine present position region discrimination method according to claim 1, wherein step (d) comprises the steps of:

(di) incrementing the present position region number by the interval length when the travelling direction is positive and the travelled distance is greater than the interval length;

(dii) decrementing the travelled distance by the interval length when the present position region number is incremented by the interval length;

(diii) decrementing the present position region number by the interval length when the travelled direction is negative and the travelled distance is less than zero; and (div) incrementing the travelled distance by the interval length when the present position region number is decremented by the interval length.

* * * * *

UNITED STATES PATENT AND TRADEMARK OFFICE
CERTIFICATE OF CORRECTION

PATENT NO. : 4,584,509
DATED : April 22, 1986
INVENTOR(S) : Kiya

It is certified that error appears in the above-identified patent and that said Letters Patent is hereby corrected as shown below:

Col. 1, line 16, after "generated" insert --indicating--.

Signed and Sealed this

Ninth Day of September 1986

[SEAL]

Attest:

DONALD J. QUIGG

Attesting Officer   Commissioner of Patents and Trademarks